Nov. 3, 1953     I. L. GREATHOUSE     2,657,718
WIRE TWISTER
Filed Aug. 31, 1951
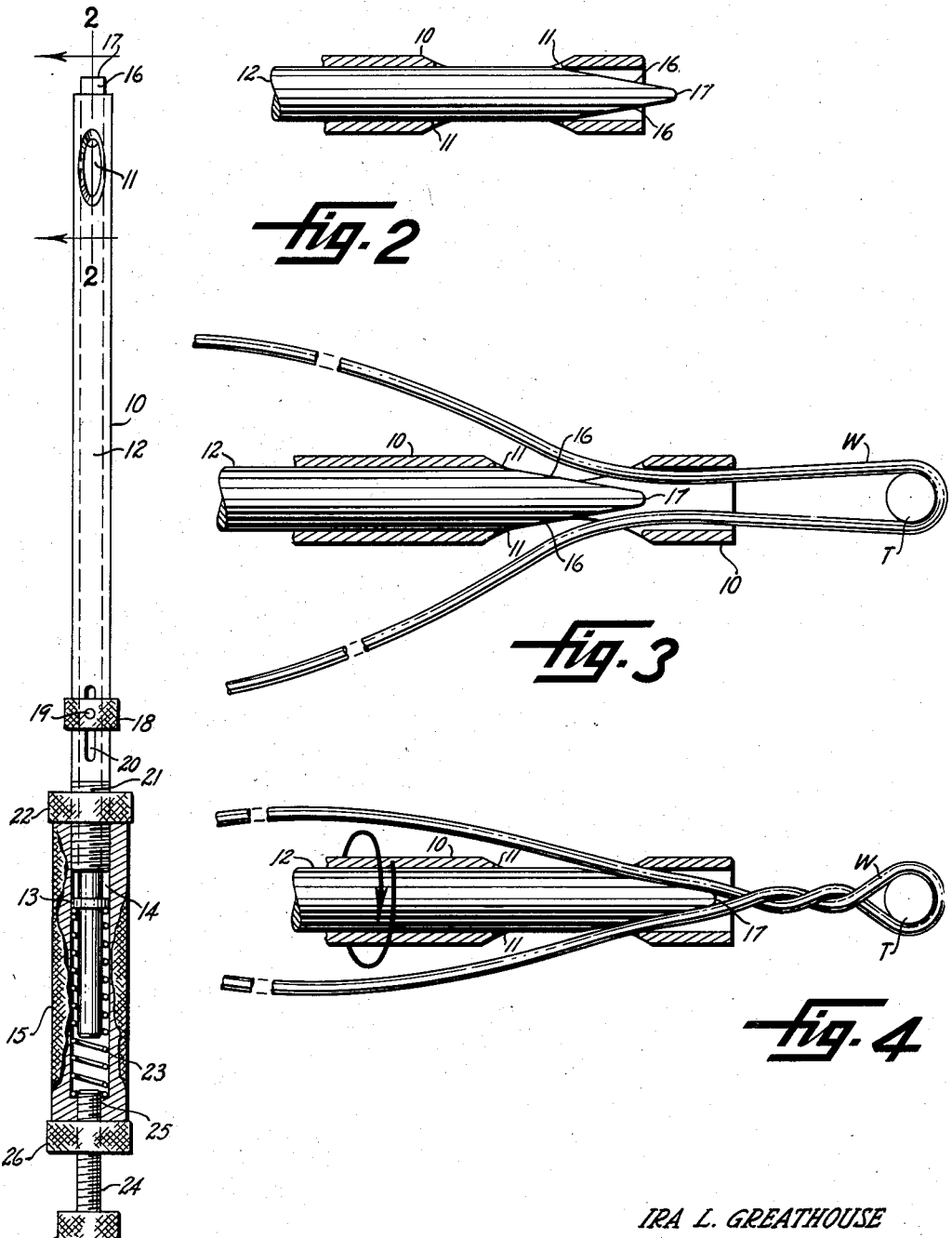
IRA L. GREATHOUSE
        INVENTOR.
BY S. Tierney Jr.
   ATTORNEY Patented Nov. 3, 1953

2,657,718

UNITED STATES PATENT OFFICE 2,657,718

WIRE TWISTER

Ira L. Greathouse, Chula Vista, Calif., assignor to Rohr Aircraft Corporation, Chula Vista, Calif., a corporation of California Application August 31, 1951, Serial No. 244,490

3 Claims. (Cl. 140—93)

This invention relates to a device for twisting wire together so that the wire becomes anchored in a desired position, and is especially adapted for twisting wires known as safety wires which are used extensively in the aircraft industry to anchor nuts to the bolts on which they are screwed.

It is an object of the invention to provide a wire twister which is small and light in weight so that it can easily be operated by one hand and is capable of being inserted into narrow spaces.

Another object is to provide means whereby the degree of tightness with which the wire is twisted may be easily regulated.

A further object is to provide means whereby the twisting device is automatically fed along the wire as it becomes twisted.

Another object is to provide means whereby a strong tension may be exerted on the wire at any stage of the twisting operation desired.

Further objects will become apparent as the description of the device proceeds. For a better understanding of the invention, reference is made to the accompanying drawing, in which:

Figure 1 is a front view, partly in section, of a wire twister embodying the invention;

Figure 2 is an enlarged sectional view of the end portion of the twister of Figure 1 taken on line 2—2;

Figure 3 is an enlarged sectional view, similar to Figure 2, showing the parts in position for insertion of the wire, and;

Figure 4 is a view similar to Figure 3 but with the parts in position for twisting wire.

The wire twister comprises a long, thin sleeve 10 provided near one end thereof with a pair of diametrically opposed holes 11 whose length is substantially greater than their width, as shown. Slidable within sleeve 10 is a cylindrical rod 12 which has spaced from its lower end an extending flange 13 which is slidable within the cylindrical bore 14 of a sleeve or handle 15.

The upper end of rod 12 has its front and rear cut away to provide two flat tapered faces 16 whose upper ends are connected by the convex end portion 17. For adjusting rod 12 within sleeve 10, a ring 18 slidable along the outside of sleeve 10 is provided, this ring being connected to rod 12 by a pin 19 anchored in rod 12 and passing through a longitudinal slot 20 in sleeve 10. The upper end of bore 14 is threaded to receive a screw thread 21 cut on sleeve 10, a lock nut 22 being screwed on thread 21 for a purpose to be described. Rod 12 is strongly biased upwardly by a compression spring 23 whose upper end bears against flange 13 and whose lower end is seated against the terminal wall of bore 14. Movable within spring 23 is a threaded screw 24 passing through a threaded hole 25 in the end of sleeve 15, a locknut 26 being threaded onto screw 24. The peripheral surfaces of members 15, 18, 22, 26 and the head 27 of screw 24 are roughened, as by knurling, to facilitate their being grasped and moved by the operator. The several parts described are preferably made of steel or other suitable metal.

In using the tool to twist a wire W which is looped about a fixed strut T, ring 18 is slid back to withdraw rod 12 from the position shown in Figures 1 and 2 into that shown in Figure 3 whereupon the ends of the wire are passed through the holes 11. The entire tool is then pushed towards strut T as far as possible and, with the operator grasping sleeve 15, the tool is rotated. As the twisting proceeds, the wire exerts a force on the tool in a direction away from strut T which automatically feeds the tool along the untwisted portion of the wire. If it is desired to increase the tightness of the twist, lock nut 22 is loosened and sleeve 10 and rod 12 rotated while sleeve 15 is held against rotation so that flange 13 is advanced towards screw 24 thereby further compressing spring 23. Lock nut 22 is then screwed into position against the end of sleeve 15.

Should for any reason it be desired to exert a strong pull on the wire as, for example, in the case of initially bending a stiff wire to the contour of strut T, screw 24 is screwed in until its end presses firmly against the end of rod 12. This causes the wire to be firmly gripped and locked between tapered faces 16 and sleeve 10 in the region at the outer end of holes 11 (position shown in Figure 4). By pulling on sleeve 15, the desired degree of tension may be applied to the wire. The tool may then be released by turning screw 24 to reset it in its initial position. This feature permits the tool to be used instead of a pair of pliers for pulling wire or like material.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A tool adapted for twisting adjacent portions of a wire together comprising: a long thin sleeve having two oppositely disposed openings spaced from the upper end thereof, said openings being adapted to pass the wire therethrough; a hollow handle secured to the lower end of said sleeve and having a cylindrical bore; a rod slidable within said sleeve and having a guide flange slidable along said bore, said rod having at its upper end a pair of inwardly converging gripping faces; a spring within said handle arranged to cause said gripping faces to press the wire against the inside of said sleeve at the upper end of said openings; and a screw coaxial with said rod threaded into said handle and arranged to engage the lower end of said rod and apply a high upward pressure thereto.

2. A tool as claimed in claim 1; in which said spring has spirally arranged turns and the upper end of said screw is disposed within said spring.

3. A tool as claimed in claim 1; in which said screw projects from the lower end of said handle and terminates in a knurled head.

IRA L. GREATHOUSE.

References Cited in the file of this patent

UNITED STATES PATENTS

| Number | Name | Date |
|---|---|---|
| 1,209,364 | Weissenborn | Dec. 19, 1916 |
| 1,209,434 | Hayden | Dec. 19, 1916 |
| 1,970,924 | Van Slyke | Aug. 21, 1934 |
| 2,020,218 | Siddle | Nov. 5, 1935 |
| 2,214,267 | Bednarek | Sept. 10, 1940 |
| 2,425,871 | Eichorst | Aug. 19, 1947 |

FOREIGN PATENTS

| Number | Country | Date |
|---|---|---|
| 874,508 | France | May 4, 1942 |